(12) United States Patent
Sawayanagi

(10) Patent No.: US 6,398,173 B1
(45) Date of Patent: Jun. 4, 2002

(54) BRACKET FOR MOUNTING AUXILIARY EQUIPMENT TO VEHICLE BODY

(75) Inventor: Masahiro Sawayanagi, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/695,927

(22) Filed: Oct. 26, 2000

(30) Foreign Application Priority Data

Nov. 10, 1999 (JP) .......................................... 11-319639

(51) Int. Cl.[7] .............................................. F16M 11/00

(52) U.S. Cl. ...................................... 248/200; 296/97.9

(58) Field of Search ............................... 248/200, 201.1, 248/309.1, 694; 296/97.9; 439/537, 34

(56) References Cited

U.S. PATENT DOCUMENTS 6,287,142 B1 * 9/2001 Sawayanagi et al. ....... 439/537

* cited by examiner

Primary Examiner—Ramon O. Ramirez
(74) Attorney, Agent, or Firm—Finnegan, Henderson, Farabow, Garrett, & Dunner, L.L.P.

(57) ABSTRACT

A bracket (20) for mounting a sun visor to a vehicle body includes a bracket body (21) by which the sun visor is supported, and a female connector (22) which is detachably attached to the bracket body (21) and capable of being connected to an electric wires (27) and (27) connected to the sun visor. The bracket body (21) is made of resin such as polyacetal. The female connector (22) is made of polybutylene terephtalate. The bracket body (21) and the female connector (22) can be made of materials suitable of required characteristics, and the cost reduction and quality improvement of the bracket (20) can be realized.

5 Claims, 11 Drawing Sheets

BRACKET FOR MOUNTING AUXILIARY EQUIPMENT TO VEHICLE BODY

BACKGROUND OF THE INVENTION

1. Field Of The Invention

The present invention relates to a bracket for mounting auxiliary equipment to a vehicle body, and more particularly, to a bracket for mounting auxiliary equipment to a vehicle body capable of supplying electricity to auxiliary equipment such as a sun visor having an electrical component.

2. Description Of The Related Art

Examples of auxiliary equipment mounted in an automobile are a sun visor a light fixture mounted on a roof of a front seat, a movable room lamp mounted to the roof, and the like. As a bracket for mounting-the auxiliary equipment to a vehicle body, there is one having a structure shown in FIG. 1. The bracket for mounting the bracket to the vehicle body is used for mounting a sun visor having a lamp (electrical component).

As shown in FIG. 1, a bracket 1 for mounting auxiliary equipment to a vehicle body comprises a plate-like bracket body 2 which is integrally formed with a connector 3. In FIG. 1, a reference number 4 represents a sun visor. The sun visor 4 is supported by a sun visor support 6 formed on the bracket body 2 through a support rod 5. One ends of electric wires 7 and 7 are connected to auxiliary equipment (not shown) on the side of the sun visor 4. The other ends of the electric wires 7 and 7 are inserted through the sun visor support 6 and connected to connection terminals 8 and 8 of the connector 3. Grommet screws 9 and 9 are projected from predetermined locations of the bracket body 2 for securing the bracket 1 to a vehicle body panel.

The bracket 1 is disposed mounted such that the connector 3, sun visor support 6, the grommet screws 9 and 9 and the like are directed toward an inner panel (not shown) through an opening formed in a trim of the roof of a front seat of the vehicle. As shown in FIG. 2, a panel-side connector 10 is disposed on the inner panel. In FIG. 2, a reference number 11 represents electric wires. One ends of the electric wires 11 and 11 connected to the panel-side connector 10.

As shown in FIG. 2, the panel-side connector 10 is attached such that their alignment can be adjusted in x-direction and y-direction. If the bracket 1 is assembled to the inner panel through an opening formed in the trim, the connector 3 and the panel-side connector 10 are fitted to each other to establish the electrical connection therebetween.

In the conventional bracket 1, however, since the bracket body 2 requires mechanical strength, rigidity and stable size, it is necessary to make the bracket body 2 of expensive resin such as polyacetal (POM). The connector 3 integrally formed together with the bracket body 2 is also made of the same material. Therefore, there is a problem that the bracket 1 is expensive as a whole due to this material cost.

Further, in the case of the conventional bracket 1, since the structure of the roof of the front seat and the mounting angle and the like are different depending upon vehicle type, it is necessary to produce the bracket 1 having the connector 3 for each vehicle type. For example, an angle between the support rod 5 of the sun visor and the bracket body 2 is different from a bracket 1 shown in FIG. 3 to a bracket 1' shown in FIG. 4. However, the shape of the connector 3 is substantially the same between these different vehicle types. Since the brackets 1 and 1' each having the connector 3 are produced depending upon the structure of the bracket body 2 except the connector 3 are produced, there is a problem that the cost is expensive. Further, even if the type of vehicle body is the same, the sun visors 4 may not have a lamp (electrical component) depending upon the grade of the vehicle. In such a case, a bracket 1(1') in which electric wires are not connected to the connector 3 is used in such a vehicle of that grade. A bracket for that grade is newly provided in some cases.

SUMMARY OF THE INVENTION

The present invention has been accomplished in view of these circumstances, and it is an object of the invention to provide a bracket for mounting auxiliary equipment to a vehicle body capable of improving its quality at low cost.

According to a first aspect of the present invention, there is provided a bracket for mounting auxiliary equipment to a vehicle body panel, comprising: a bracket body by which the auxiliary equipment is supported, and a first connector detachably attached to the bracket body and capable of being connected to an electric wire connected to the auxiliary equipment, wherein in a state in which the bracket body is mounted to the vehicle body panel, a second connector disposed on the vehicle body panel is connected to the first connector.

With the first aspect, since the first connector is a separate member which is detachably attached to the bracket body, a structure of the bracket body can be simplified, and the bracket body can be formed easily. According to the first aspect of the invention, even if the bracket body facing the passenger room is changed in accordance with the vehicle type or its grade, the first connector can be used widely, and the first connector need not be made of material of the bracket. Therefore, the cost of the bracket can be reduced.

According to a second aspect, in the bracket of the first aspect, the bracket body and the first connector are made of different materials.

Therefore, with the second aspect, in addition to the effect of the first aspect, the bracket body can be made of resin having high mechanical strength and rigidity, and the first connector can be made of resin having high heat resistance and electrical insulating strength, and the bracket body and the first connector can be made of materials suitable of required characteristics, and the cost reduction and quality improvement of the bracket can be realized.

According to a third aspect, in the bracket of the first aspect, the bracket body is formed with an engagement groove directed to the other end, and the first connector is formed with an engaging portion which engages the engagement groove.

Therefore, with the third aspect, in addition to the effect of the first aspect, it is possible to easily mount the first connector to the bracket body by inserting and engaging the engaging portion of the first connector to and with the engagement groove formed in the bracket body.

According to a fourth aspect, in the bracket of the first aspect, the auxiliary equipment is a sun visor disposed on a roof portion of a vehicle body.

Therefore, with the fourth aspect, in addition to the effect of the first aspect, even if the shape or structure of the bracket is changed in accordance with the vehicle type, if the first connector is engaged and a roof inner panel which is the vehicle panel includes the second connector, the first connector and the second connector can generally be used in different vehicles. Therefore, the cost of the bracket can be reduced. Further, when the sun visor itself has an electric component, the sun visor can be connected to the second connector using the first connector, and when the sun visor itself does not have the electric component, the sun visor can be mounted to the bracket body without mounting the first connector. Therefore, even when the type of the vehicle is the same and the grade is different, the bracket body can generally be used.

According to a fifth aspect, in the bracket of the first aspect, the second connector is supported by a roof trim disposed on an inner panel of a vehicle body on the side of a passenger room.

Therefore, with the fourth aspect, in addition to the effect of the first aspect, even if the second connector is supported by the roof trim, it is possible to reliably support the second connector by the vehicle body panel by mounting the bracket body to the vehicle body panel.

DESCRIPTION OF THE PREFERRED EMBODIMENTS

Figure 1:
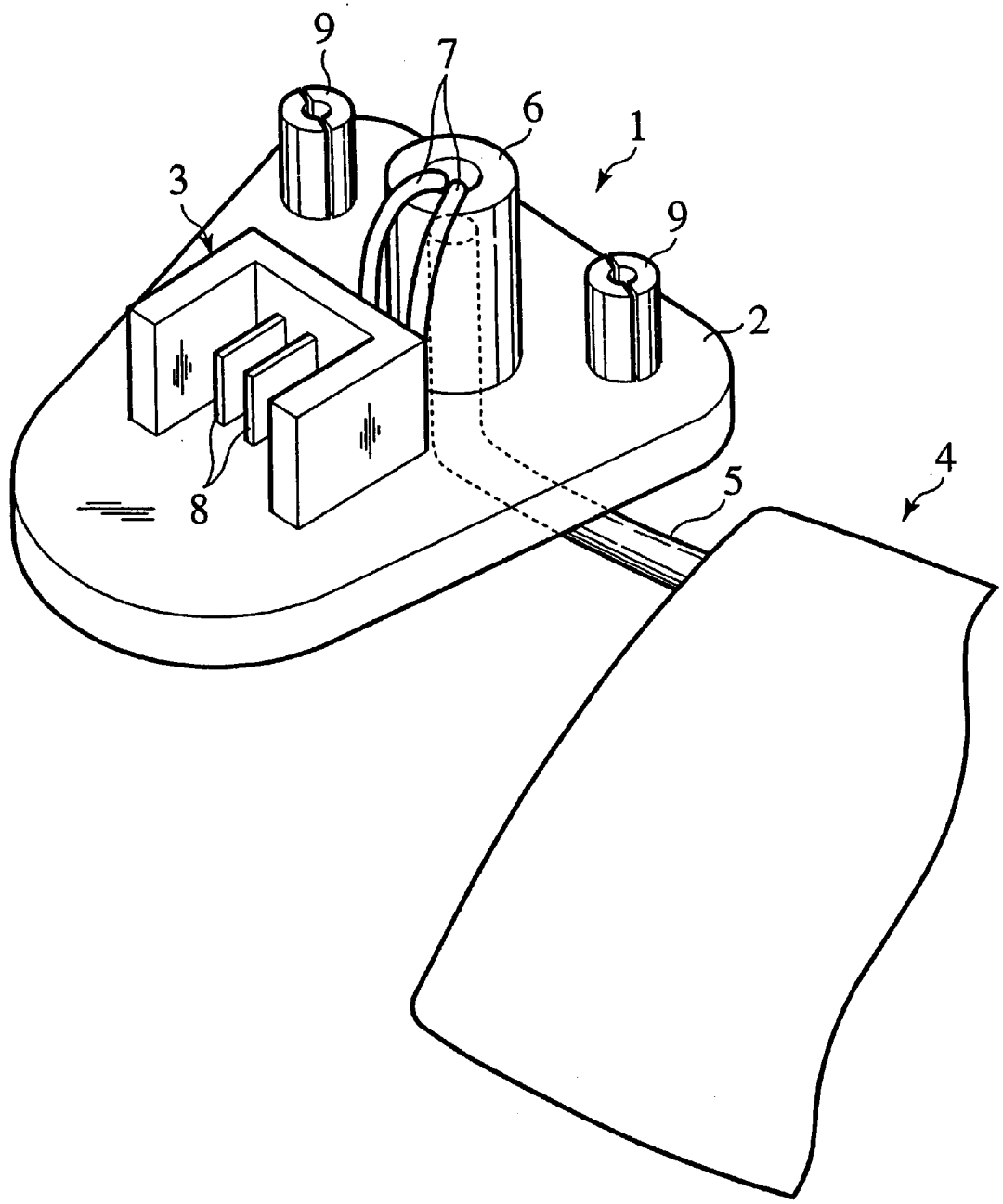
FIG. 1 is a conventional bracket mounting apparatus to a vehicle body.
Figure 2:
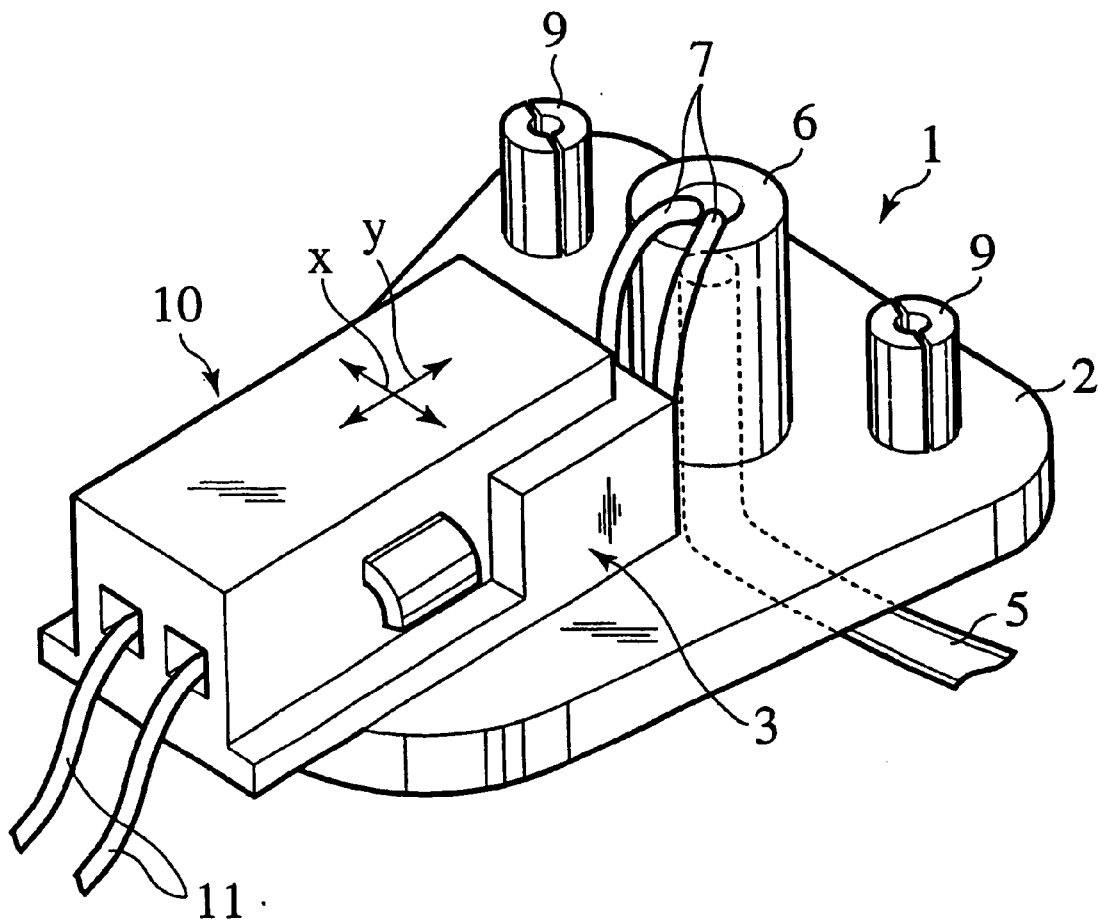
FIG. 2 is a perspective view of the conventional bracket to which a connector is connected.
Figure 3:
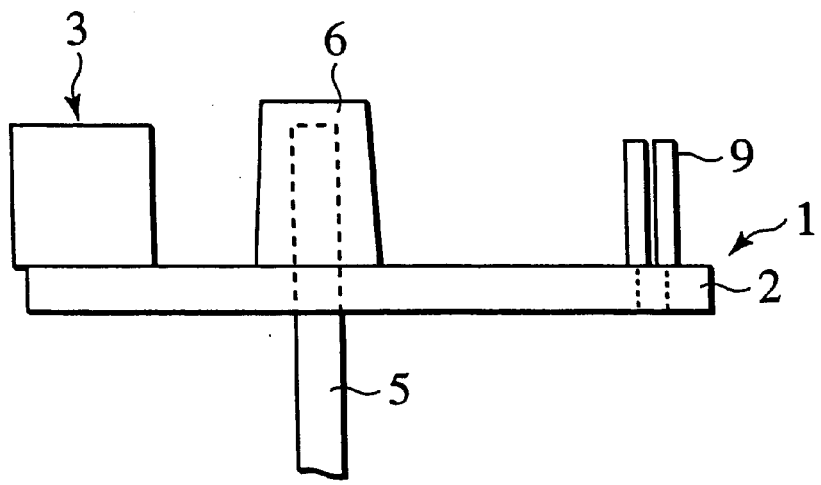
FIG. 3 is a side view showing an example of a structure of the conventional bracket.
Figure 4:
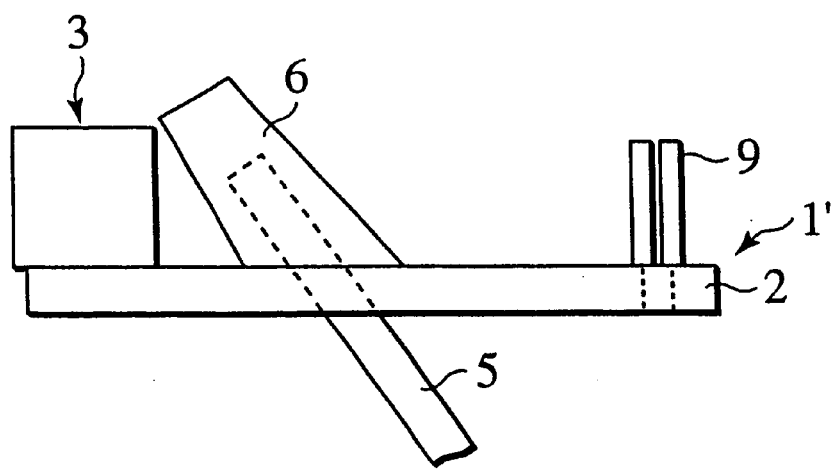
FIG. 4 is a side view of another example of the structure of the conventional bracket.

A bracket of the present invention for mounting auxiliary equipment to a vehicle body will be explained in detail based on an embodiment shown in the drawings. In this embodiment, the auxiliary equipment is a sun visor having an electrical component to be mounted to a roof portion of a front seat.

Figure 5:
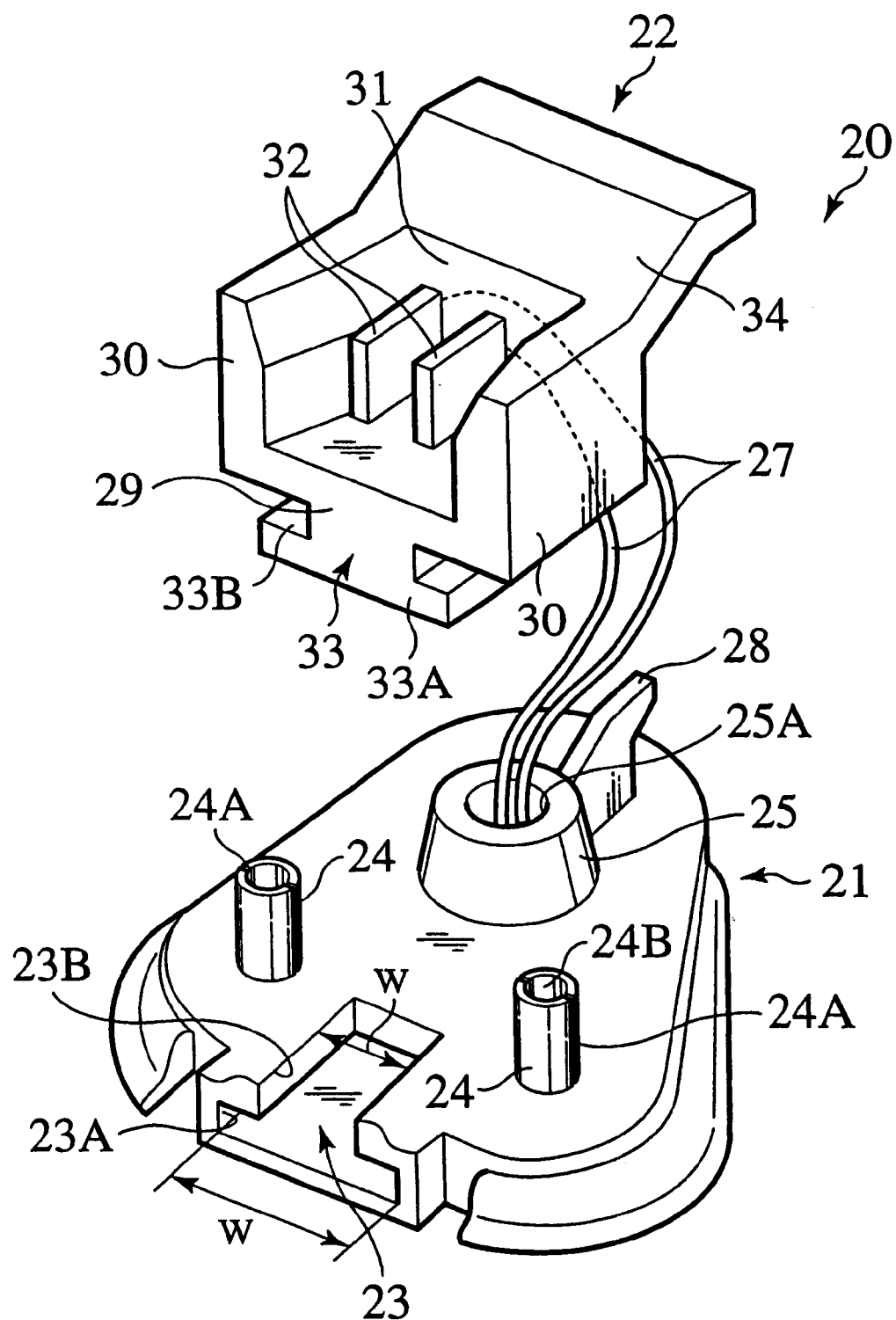
FIG. 5 is an exploded perspective view showing a bracket for mounting auxiliary equipment (sun visor) to a vehicle body according to an embodiment of the present invention.

FIG. 5 is an exploded perspective view showing the bracket 20 for mounting the auxiliary equipment to the vehicle body according to this embodiment. The bracket 20 includes a bracket body 21 and a female connector 22 as a first connector.

The bracket body 21 is of a substantially flat plate-like shape, and is made of polyacetal (POM) having high mechanical strength and rigidity. The bracket body 21 is formed at its one end with an engagement groove 23 such that the engagement groove 23 is extended through a predetermined length toward the other end of the bracket body 21. An engaging portion 33 formed on a lower portion of a female connector (which will be described later) can be inserted into the engagement groove 23. A width W of an inside 23A of the engagement groove 23 is set wide, and a width w of an opening 23B of an upper portion of the groove is set narrow.

Grommet screws 24 and 24 are projected from the bracket body 21 on the side of an inner panel opposite from a side facing a passenger room when the bracket 20 is mounted to the roof portion of the vehicle body. The grommet screws 24 and 24 are disposed at locations to sandwich the engagement groove 23. The grommet screws 24 and 24 are substantially cylindrical in shape, and their opposed side portions are formed with slits 24A and 24A along height direction. Each of the grommet screws 24 and 24 has a cylindrical hole formed throughout the bracket body 21. The cylindrical hole is set such that its diameter is gradually reduced from an upper opening 24B toward a passenger room-side opening of the bracket body 21. Therefore, if a grommet screw projection (not shown) is inserted into the cylindrical hole of each of the grommet screws 24 and 24 from the passenger room-side opening, an upper portion of the grommet screw 24 is expanded and secured to the inner panel.

Further, a substantially cylindrical sun visor support 25 is projected from the inner panel side surface of the bracket body 21 in the vicinity of the other end thereof. The sun visor support 25 has a cylindrical hole 25A which is also formed throughout the bracket body 21. A support rod 26 of the sun visor is rotatably fitted and held in the cylindrical hole 25A from the passenger room-side surface. A pair of electric wires 27 and 27 connected to a lamp used for a vanity mirror of the sun visor for example are inserted through the support rod 26 of the sun visor.

A hanging projection 28 for hanging the bracket body 21 on the inner panel side is projected from the other end of the bracket body 21 on the side of the inner panel.

Figure 6:
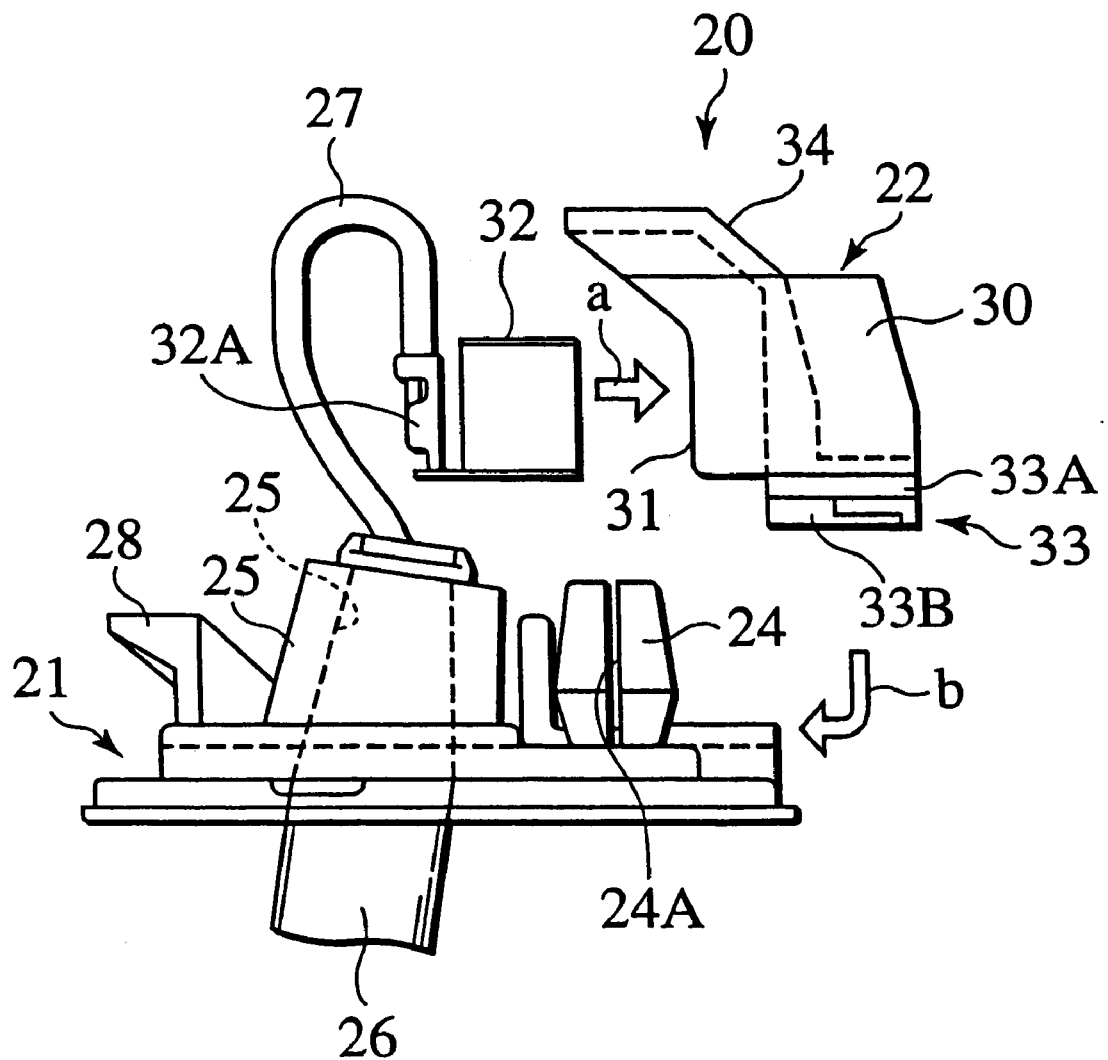
FIG. 6 is an exploded perspective view of the bracket of the embodiment.

Next, a structure of the female connector 22 will be explained. The female connector 22 is made of resin material or the like having high heat resistance and electrical insulating strength such as polybutylene terephtalate (PBT). The female connector 22 comprises a rectangular bottom plate 29, side plates 30 and 30 rising from opposite edges of the bottom plate 29, and a back plate 31 rising from the other edge of the bottom plate 29 for connecting the side plates 30 and 30 to each other. A pair of connection terminals 32 and 32 inserted from outside of the back plate 31 are projected into space surrounded by the bottom plate 29, side plates 30 and 30, and the back plate 31. As shown in FIGS. 5 and 6, the electric wires 27 and 27 led out from the cylindrical hole of the sun visor support 25 of the bracket body 21 are connected to the connection terminals 32 and 32. The back plate 31 is integrally formed at its upper portion with an inclined guide plate 34 inclined diagonally upward rearwardly. The inclined guide plate 34 has a function as a cover for protecting the electric wires 27 and 27 and a function for guiding a male connector (second connector) 40 which will be explained later.

As shown in FIG. 6, each end of the electric wire 27 is swaged to a swaging portion 32A provided on a rear lower portion of each of the connection terminals 32 and 32. A lower surface of the bottom plate 29 of the female connector 22 is formed with an engaging portion 33 to be inserted into the engagement groove 23 of the bracket body 21. The engaging portion 33 comprises a narrow portion 33A to be inserted into the narrow opening 23B of the engagement groove 23, and a wide portion 33B integrally formed on a lower portion of the narrow portion 33A. The wide portion 33B is to be inserted into the inside 23A of the engagement groove 23.

Figure 7:
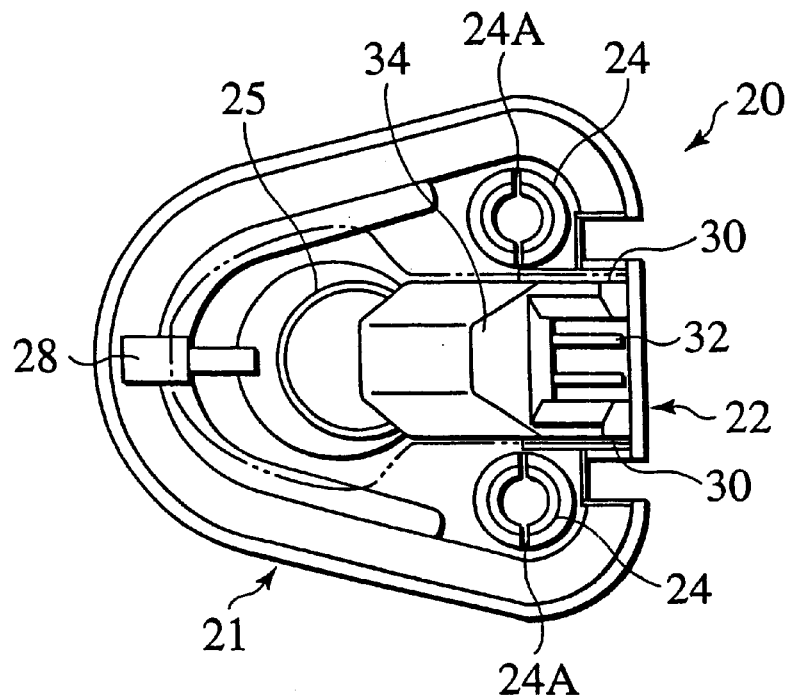
FIG. 7 is a plan view of the assembled bracket of the embodiment.
Figure 8:
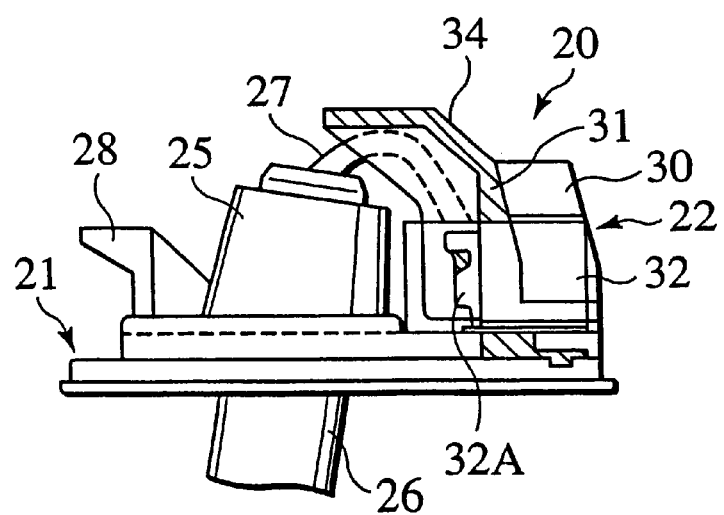
FIG. 8 is a partial sectional view of the bracket of the embodiment.
Figure 9:
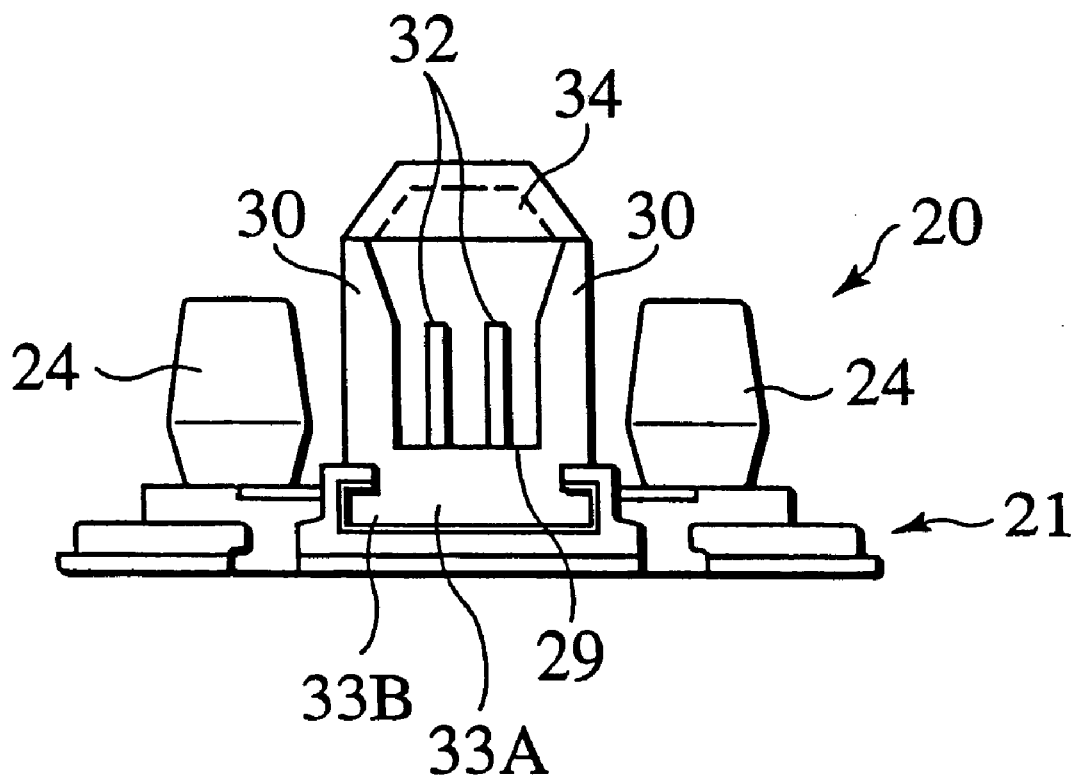
FIG. 9 is a front view of the bracket of the embodiment.

Next, an assembling procedure of the bracket 20 of this embodiment for mounting the auxiliary equipment to the vehicle body will be explained. First, as shown in FIG. 6, the electric wires 27 and 27 are let out from the cylindrical hole of the sun visor support 25, and the ends of the electric wires 27 and 27 are swaged to the swaging portions 32A of the connection terminals 32 and 32. Next, as shown with an arrow a in FIG. 6, the connection terminals 32 and 32 are inserted into an insertion hole (not shown) formed in the back plate 31 and held in a state in which the connection terminals 32 and 32 are projected into the space in the back plate 31. Then, as shown with an arrow b in FIG. 6, the female connector 22 is inserted into the front end of the engagement groove 23 from the rear end of the engaging portion 33, thereby mounting the female connector 22 to the bracket body 21, and the assemble of the bracket 20 is completed. FIG. 7 is a plan view of the assembled bracket, FIG. 8 is a partial sectional view thereof, and FIG. 9 is a front view of thereof as viewed from one end.

Next, a method of the present embodiment for mounting the bracket 20 to the roof portion of the front sear of the vehicle will be explained.

Figure 10:
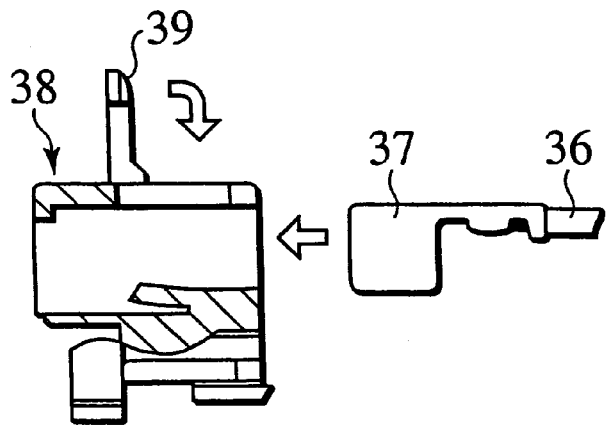
FIG. 10 is a sectional view of a male connector of the embodiment for showing an assembling procedure.
Figure 11:
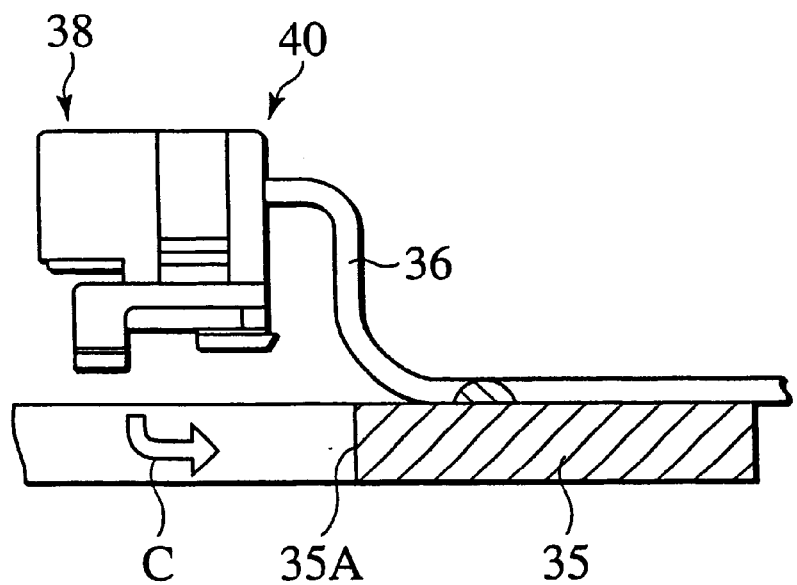
FIG. 11 is a sectional view of the male connector of the embodiment for showing the assembling procedure.

First, before the bracket 20 of this embodiment is mounted, a method for mounting the male connector 40 as the second connector to the roof will be explained using FIGS. 10 and 11. First, a connection terminal 37 shown in FIG. 10 is connected to a terminal of an electric wire 36 on the side of the vehicle body arranged on the back side (upper side) of a roof trim 35 as shown in FIG. 11. The connection terminal 37 is inserted and disposed into a male connector housing 38, a lid 39 provided on the male connector housing 38 is closed to hold the connection terminal 37, thereby assembling the male connector 40 as shown in FIG. 11. Then, as shown with an arrow c in FIG. 11, the male connector 40 is moved to an opening edge of a mounting opening 35A formed in the roof trim 35, and the male connector 40 is held in the opening edge of the mounting opening 35A of the roof trim 35 as shown in FIG. 12.

Figure 12:
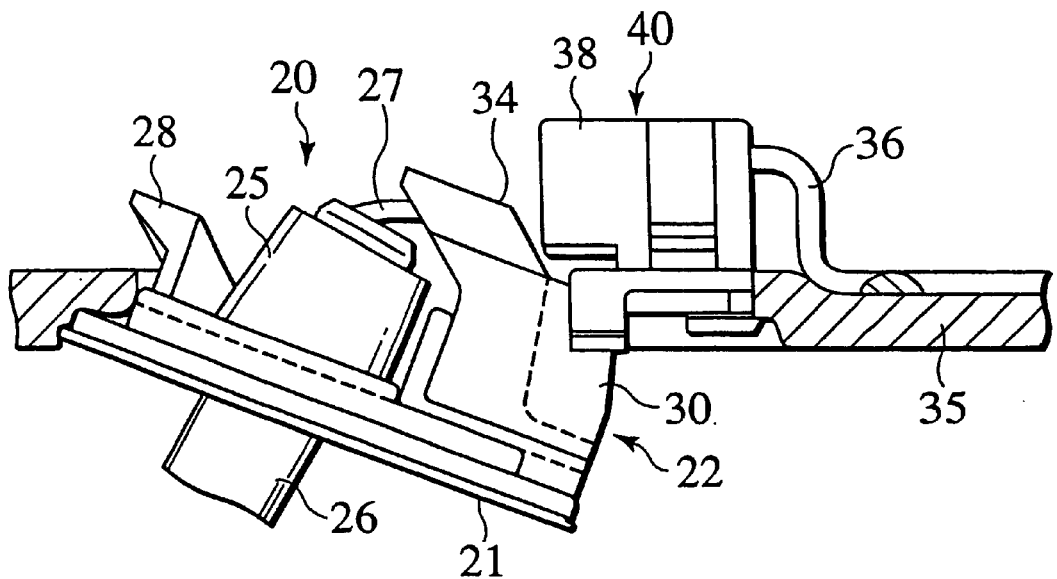
FIG. 12 is a sectional view of the bracket of the embodiment for showing the mounting procedure.
Figure 13:
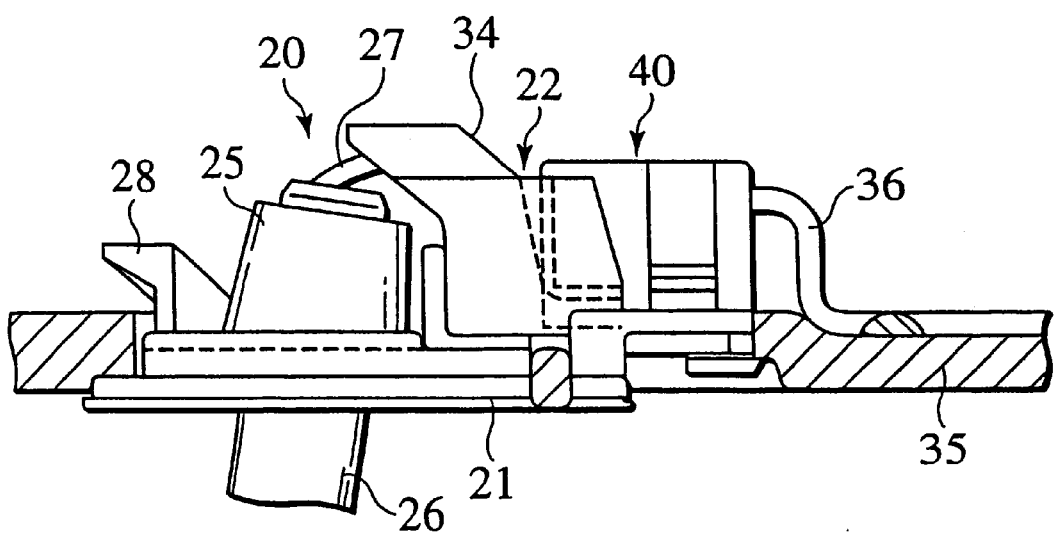
FIG. 13 is a sectional view of the bracket of the embodiment for showing the mounting procedure.
Figure 14:
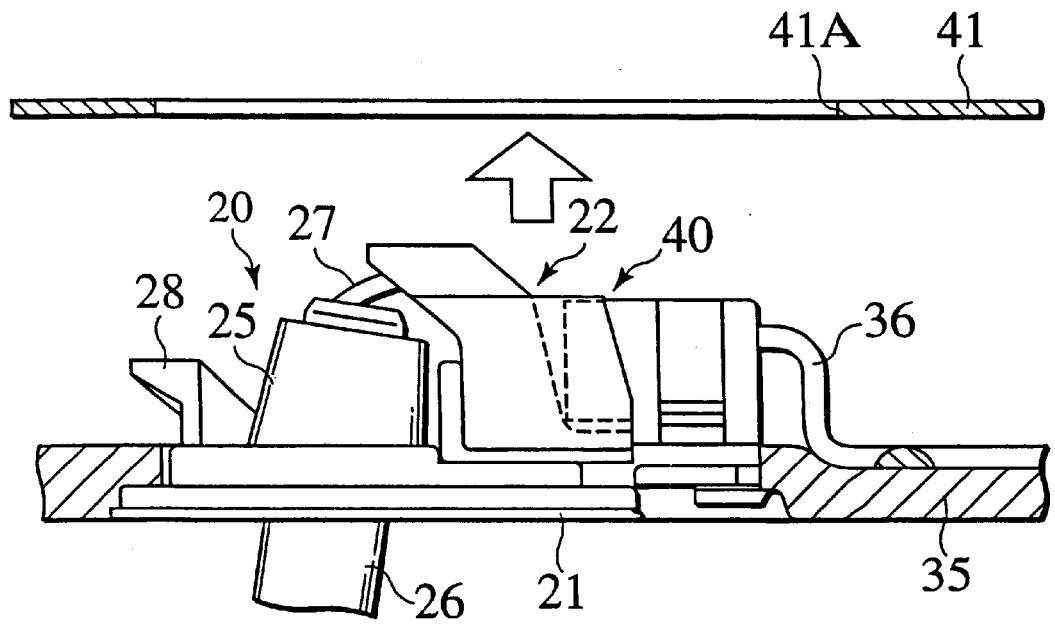
FIG. 14 is a sectional view of the bracket of the embodiment for showing the mounting procedure.
Figure 15:
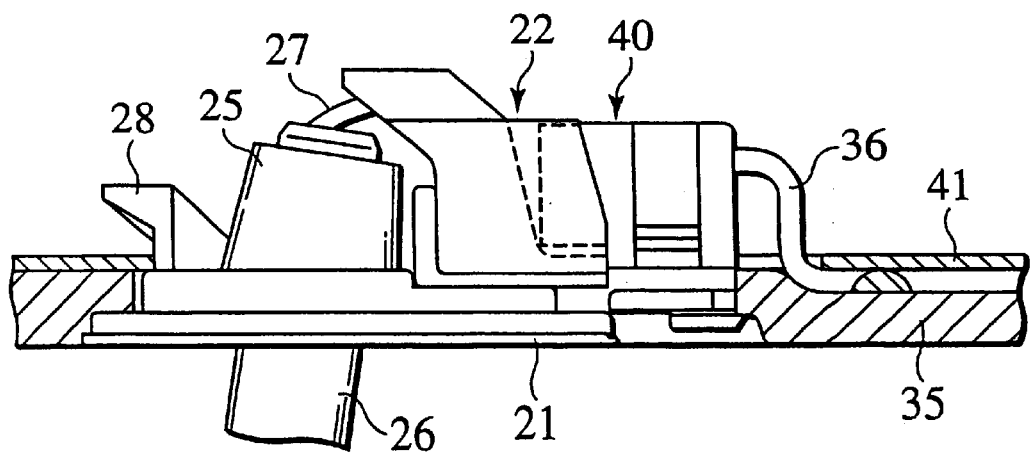
FIG. 15 is a sectional view of the bracket of the embodiment for showing the mounting procedure.

Next, as shown in FIG. 12, the bracket 20 for mounting the sun visor to the vehicle body is moved such that the female connector 22 is moved upward around a connection portion between the hanging projection 28 and the roof trim 35 to accommodate the male connector 40 in the female connector 22 in a state in which the hanging projection 28 is hung on the opening edge of the mounting opening 35A of the roof trim 35. As a result, as shown in FIG. 13, the female connector 22 and the male connector 40 are connected to each other. In this state, as shown in FIG. 14, the bracket 20 connected to the male connector 40 is inserted into a mounting hole 41A and the like, a grommet screw projections (not shown) are inserted into the grommet screws 24 and 24. Then, the upper portions of the grommet screws 24 and 24 are expanded, and the bracket 20 is secured to the inner panel 41 as shown in FIG. 15.

Figure 16A:
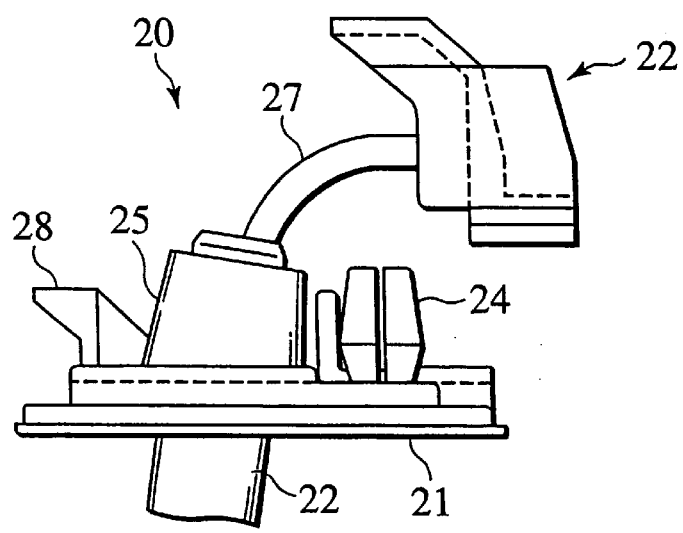
FIGS. 16A and 16B are side views showing the mounting procedure in which the bracket of the embodiment uses a female connector.
Figure 16B:
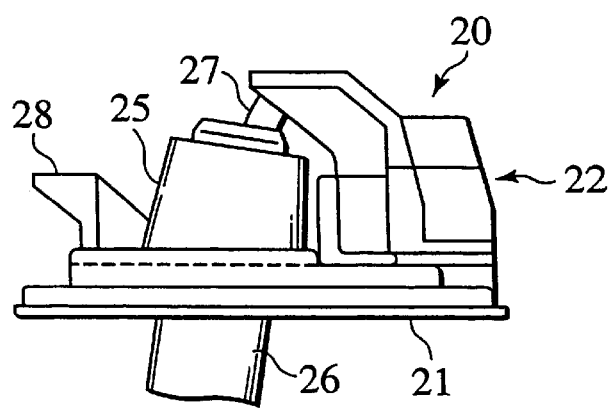
Figure 17:
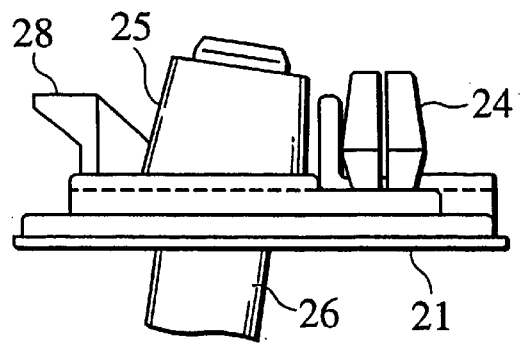
FIG. 17 is a side view showing the mounting procedure in which the bracket of the embodiment does not use the female connector

In the bracket 20 of the present, the bracket body 21 and the female connector 22 are separate members, and they are made of materials suitable for respective functions. Therefore, the quality of the bracket 20 can be improved. By using the female connector 22 and the male connector 40, it is possible to widely use the female connectors 22 for a plurality of vehicle types, it is unnecessary to prepare only the bracket bodies for each of the vehicle types and thus, the cost can be cut down. Further, apart from the case in which the female connector 22 is assembled into the bracket body 21 and applied to the sun visor having the electrical component as shown in FIGS. 16A and 16B, when the sun visor having no electrical component is mounted, the bracket body 21 can be used without using the female connector 22 as shown in FIG. 17. Therefore, the same bracket bodies 21 can be used for both mounting sun visors having electrical components and sun visors having no electrical component in the same type of vehicles with different grade. Thus, the cost can be reduced.

Although the embodiment has been explained above, the present invention is not limited to this, and various changes relating to the subject matter of the structure can be made. For example, although the female connector 22 is assembled into the bracket body 21 in the above embodiment, the male connector may be assembled into the bracket body 21 of course.

Further, the connector to be engaged with the bracket body 21 is not limited to the engaging means to be fitted to the engagement groove 23 formed in the bracket body 21, and various kinds of engaging means may be used.

Further, the above embodiment is the example in which the present invention is applied to a bracket for mounting a sun visor to a vehicle body, but the invention can also be applied to a bracket for mounting auxiliary equipment such as a movable room lamp or the like to a vehicle body.

What is claimed is:

1. A bracket for mounting auxiliary equipment to a vehicle body panel, comprising:

a bracket body by which said auxiliary equipment is supported, and a first connector detachably attached to said bracket body and capable of being connected to an electric wire connected to said auxiliary equipment, wherein in a state in which said bracket body is mounted to said vehicle body panel, a second connector disposed on said vehicle body panel is connected to said first connector.

2. A bracket for mounting auxiliary equipment to a vehicle body panel according to claim 1, wherein said bracket body and said first connector are made of different materials.

3. A bracket for mounting auxiliary equipment to a vehicle body panel according to claim 1, wherein said bracket body is formed with an engagement groove directed to the other end, and said first connector is formed with an engaging portion which engages said engagement groove.

4. A bracket for mounting auxiliary equipment to a vehicle body panel according to claim 1, wherein said auxiliary equipment is a sun visor disposed on a roof portion of a vehicle body.

5. A bracket for mounting auxiliary equipment to a vehicle body panel according to claim 1, wherein said second connector is supported by a roof trim disposed on an inner panel of a vehicle body on the side of a passenger room.

* * * * *